United States Patent Office 3,229,906
Patented Jan. 18, 1966

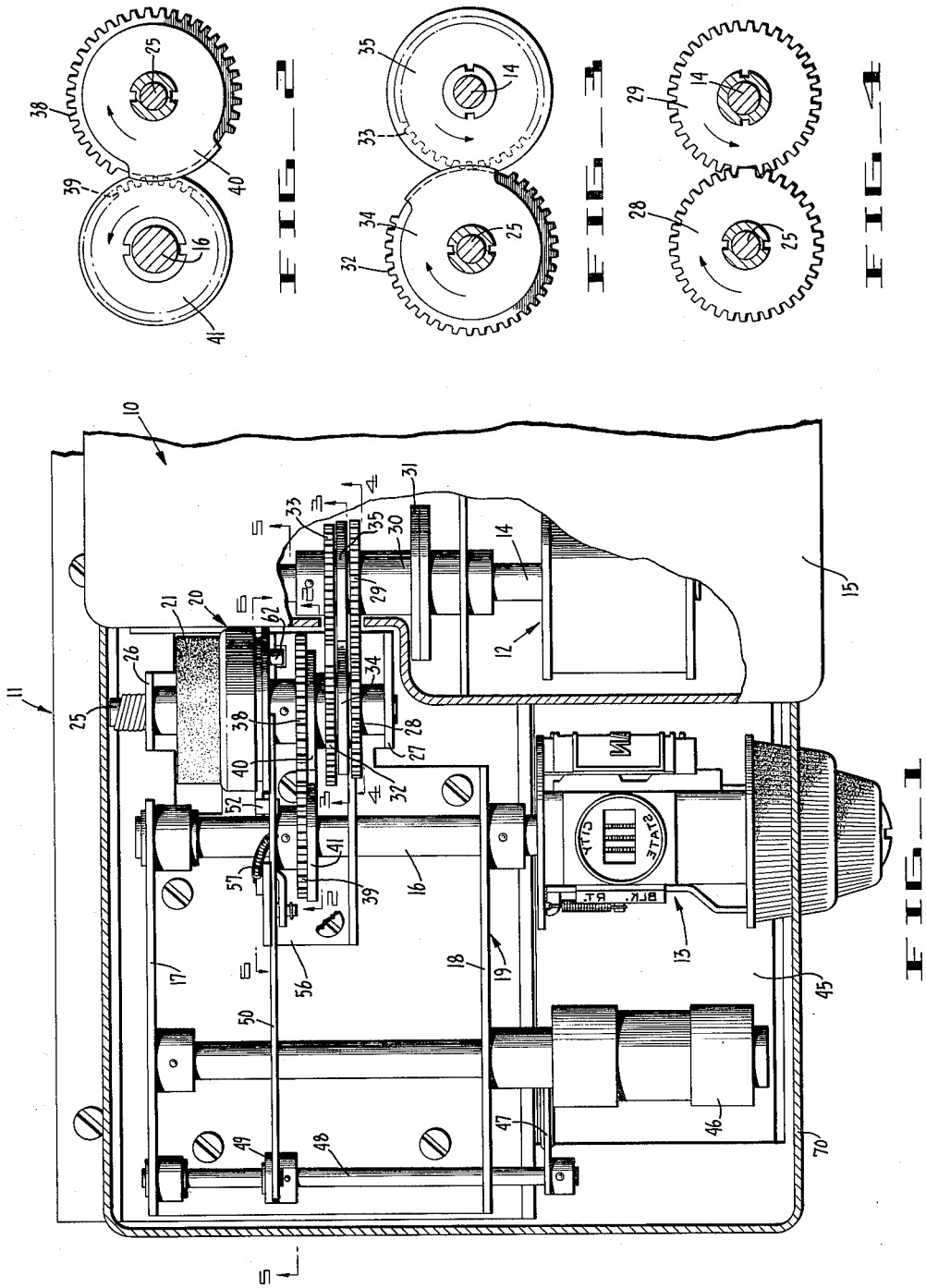

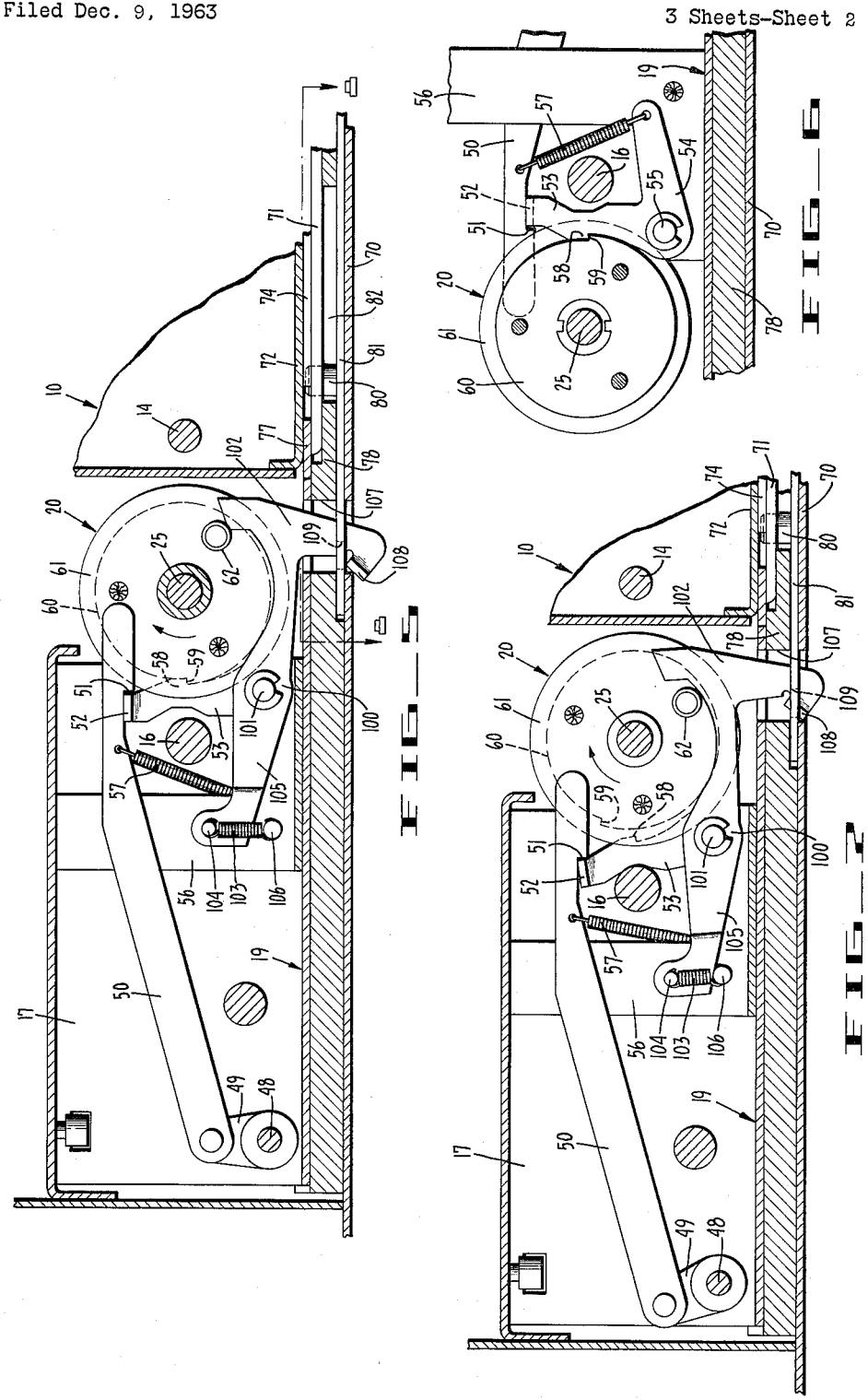

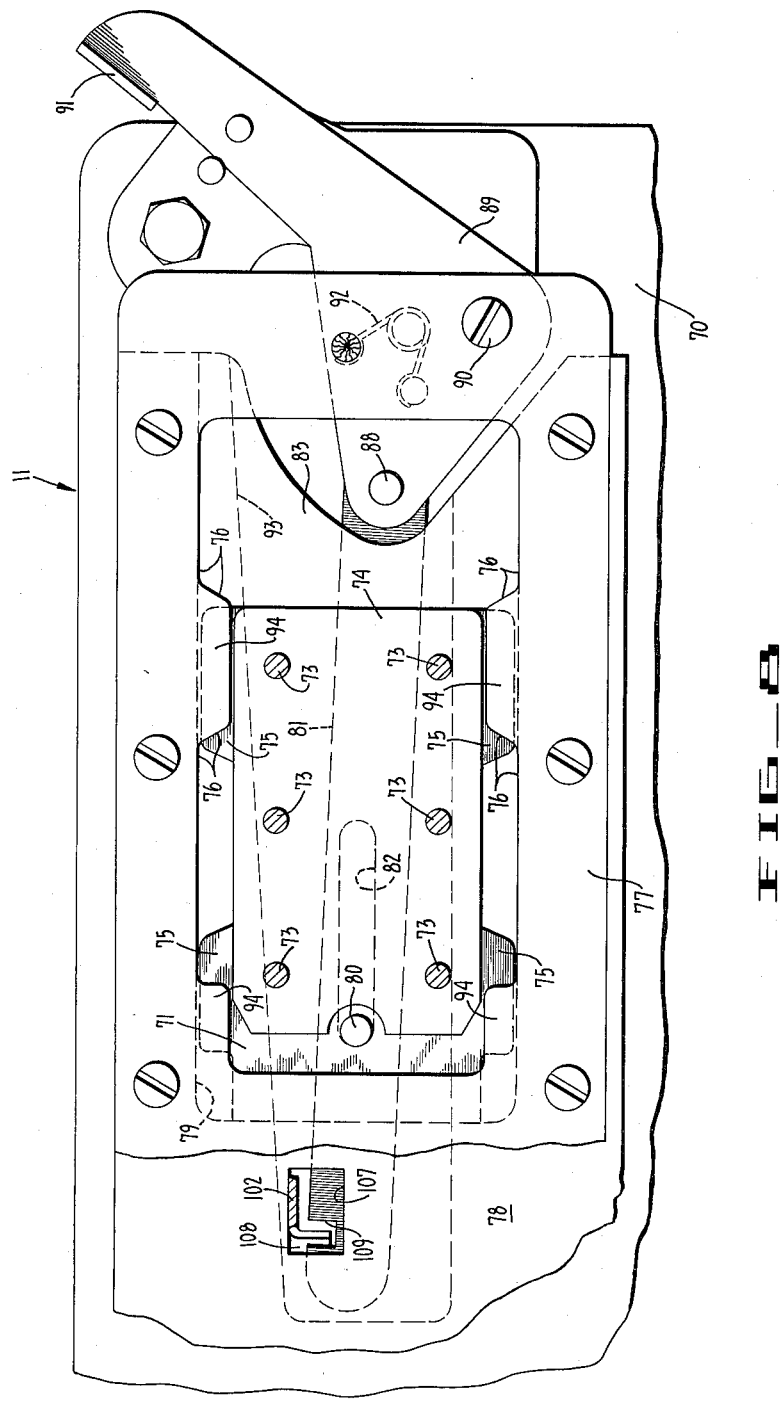

3,229,906
POSTAGE METER LOCKING DEVICE
Charles S. Balaz, Hayward, Calif., and Ingemar H. Lundquist, Goteborg, Sweden, assignors to Friden, Inc., a corporation of Delaware
Filed Dec. 9, 1963, Ser. No. 329,008
2 Claims. (Cl. 235—101)

This invention relates to a detachable meter unit, and more particularly to a locking device for preventing undesirable removal of the meter unit from the machine base of a postage meter machine.

In postage meter machines, the meter unit is adapted to be mounted on a machine base for cyclical operation by a power mechanism within the base and, by means of a manually controlled member, is locked in operative position thereon. The meter unit may also be released to an inoperative position by the manually controlled member for detachment from the machine base. However, the meter unit has a printing drum which, in its full-cycle position, is locked such that the printing elements are in a concealed position. If a cyclic operation is terminated before completion of the cycle and the meter unit is detached from the machine, it would be possible to take a fraudulent impression from the printing elements in the drum. Also, if the meter unit is inadvertently released to the inoperative position during a machine operation and an atempt is made to immediately return it to the operative position, the driving and driven mechanisms would be out of phase and damage to the parts would result.

It is an object of the present invention, therefore, to provide means for preventing release of a detachable cyclically operable unit for removal from a machine base in other than a full-cycle condition of the unit.

It is another object of the present invention to provide a secondary locking means for the locking mechanism utilized to lock the meter unit in an operative position on the base, which secondary locking means is cyclically controlled and normally operable to enable release of the meter unit by the locking mechanism to an inoperative positive for detachment from the base.

Other objects and advantages will be apparent from the following description of a preferred embodiment of the invention as illustrated in the accompanying drawings, in which:

FIG. 1 is a fragmentary, sectional plan view of the postage meter machine showing the meter unit in its operative position relative to the drive means for controlling cyclic rotation of each of two printing drums in synchronism.

FIG. 2 is a detailed elevational view of the drive means for one printing drum, the view being taken on the plane indicated by line 2—2 in FIG. 1.

FIG. 3 is a detailed elevational view of the drive means for the meter unit printing drum, the view being taken on the plane indicated by line 3—3 in FIG. 1.

FIG. 4 is a detailed elevational view of the gearing for controlling the disablement of the adjustment mechanism for the printing elements in the meter unit printing drum during rotation of the drum, the view being taken on the plane indicated by line 4—4 in FIG. 1.

FIG. 5 is a sectional, elevational view of the cyclic clutch and the controls therefor, the view being taken on the plane indicated by the line 5—5 in FIG. 1.

FIG. 6 is a fragmentary sectional, elevational view showing the clutch control means, the view being taken on the plane indicated by the lince 6—6 in FIG. 1.

FIG. 7 is a view similar to FIG. 5 showing the relationship of the parts upon engagement of the cyclic clutch.

FIG. 8 is a plan view of the meter unit support on the machine base on which the meter unit is slidably adjusted to operative position, the view being taken on the plane indicated by the line 8—8 in FIG. 5.

The invention is preferably shown as being embodied in a postage meter machine of the type disclosed in the Patent No. 3,107,854 issued October 22, 1963 to Ingemar H. Lundquist. In the embodiment shown, the meter unit 10 (FIG. 1) is removably mounted upon the machine base 11 of the metered mailing machine. The meter unit contains the rotary printing drum 12 for the printing of the postage indicia and conventional mechanism for controlling the additive and subtractive registration of the value in the indicia. Base unit 11 contains the auxiliary rotary printing drum 13 for the printing of the town circle, date and slogan and, also, the cyclic drive mechanism for driving the printing drums in synchronism, one with the other.

The rotary printing drum 12 is secured on the shaft 14 (FIG. 1), suitably journalled in the meter unit 10, and carries the postage indicia printing elements normally concealed within the meter unit cover 15. Similarly, the auxiliary printing drum 13 is secured on the shaft 16, journalled in the vertically disposed parallel flanges 17 and 18 of bracket 19 in axially parallel relationship to meter drum shaft 14. Each of the printing drums 12 and 13 is caused to rotate in synchronism with the other, upon engagement of the cyclic clutch 20, which is driven by an electric motor (not shown) through the endless belt 21. The driven side of the clutch 20 is secured on the shaft 25, which is journalled in the parallel vertically disposed flanges 26 and 27 of bracket 19 in parallel relationship to, and intermediate, shafts 14 and 16. Also secured on shaft 25 are the gears and Geneva wheels which serve to impart synchronous cyclic rotation to the printing drums 12 and 13.

Immediately upon engagement of clutch 20, gear 28, secured on shaft 25 and enmeshed with gear 29, causes rotation of the cam disk 31 for a purpose not considered pertinent to the invention, but fully described in the afore-mentioned Patent No. 3,107,854. Gear 29 and cam disk 31 are secured on opposite ends of sleeve 30, rotatable on shaft 14. Following an initial rotation of gear 29, mutilated gear 32 (FIGS. 1 and 3), secured on shaft 25, enmeshes with gear 33, secured on shaft 14, to effect a cycle of rotation of printing drum 12. During the initial rotation of gear 29, rotation of shaft 14 and, therefore, printing drum 12 is precluded by the cooperation of Geneva wheel 34, secured on shaft 25 adjacent gear 32, and disk 35, secured on shaft 14 adjacent gear 33. The cyclic rotation of the auxiliary printing drum 13, synchronously with printing drum 12, is controlled in a similar manner to that of the rotation of drum 12. Mutilated gear 38 (FIGS. 1 and 2), secured on shaft 25, enmeshes with gear 39 on auxiliary printing drum shaft 16 simultaneously with the meshing of mutilated gear 32 and gear 33 (FIGS. 1 and 3). As in the case of the printing drum 12, any rotation of auxiliary printing drum 13 is precluded, during the initial rotation of gears 28 and 29 (FIG. 4), by the cooperation of Geneva wheel 40 with disk 41 (FIGS. 1 and 2) secured, respectively, on shafts 25 and 16. Referring to FIGS. 2, 3 and 4, each pair of cooperating gears 28 and 29, gears 32 and 33 and associated Geneva system 34 and 35, and gears 38 and 39 and associated Geneva system 40 and 41 is shown in the full-cycle position.

The operation of the cyclic clutch 20 is controlled by an envelope as it is moved into engagement with the endless belt 45 (FIG. 1), between the belt and pressure roller 46, to be conveyed, thereafter, by the belt for a postmark impression from the printing drums 12 and 13. As the leading edge of an envelope is moved into frictional engagement with the endless belt 45, it also contacts the free end of the trip arm 47 which is pinned at its other end on shaft 48 journalled in flanges 17 and 18 of bracket 19, rocking arm 47 and shaft 48 counter-clockwise, as viewed from below in FIG. 1. Intermediate flanges 17 and 18, shaft 48 carries the arm 49 having its free end pivotally supporting one end of the clutch-engaging link 50 (FIGS. 1, 5, 6 and 7). To effect engagement of the conventional type clutch 20, the shoulder 51 formed in the lower edge of the link 50, adjacent the free end thereof, is normally in engagement with the laterally extended ear 52 on the upper end of one arm 53 of bellcrank 54 rockably mounted on stud 55 secured on bracket 56 (see, for example, FIG. 6). Spring 57, secured at its one end in the other arm of bellcrank 54 and at its other end in link 50, normally resiliently urges the shoulder 51 of link 50 into engagement with the ear 52 of bellcrank 54. Spring 57 also serves to bias bellcrank 54 in a counter-clockwise direction (FIG. 6) to resiliently maintain the tooth 58, formed on the arm 53 of the bellcrank 54, in engagement with the shoulder 59, formed in the periphery of the circular plate 60, thereby retaining clutch 20 in its full-cycle inactive position. Circular plate 60 and disk 61, concentrically secured thereto, form the driven side of the clutch 20.

Upon rocking shaft 48 in a counter-clockwise direction (FIGS. 1, 5 and 7), link 50 is moved to the left as seen in FIG. 7, thereby disengaging tooth 58 on bellcrank 54 from engagement with the shoulder 59 on plate 60 of clutch 20. Following the engagement of clutch 20, the shoulder 51 of link 50 would normally remain in engagement with ear 52 of the bellcrank 54, under the influence of spring 57. However, in order to restrict clutch 20 to a single cycle of operation, roller 62, secured on disk 61 and circular plate 60 rotating in a clockwise direction (FIG. 7), becomes effective midway in the cycle to engage the rounded end portion of link 50, thereby lifting shoulder 51 from its engagement with the lateral extension 52 of the bellcrank 54. Thereupon, spring 57 immediately urges bellcrank 54 in a clockwise direction (FIG. 7) to position tooth 58 for engagement with the shoulder 59 on plate 60, thereby disengaging clutch 20 in the full-cycle position thereof.

The foregoing description is believed to be sufficient for an understanding of the conventional drive mechanism of the postage meter machine, however, for a more complete description reference is to be had to the afore-mentioned Patent No. 3,107,854.

In order to operate, the meter unit 10 must be secured in operating position upon the top surface of the cover 70 of machine base 11. Upon securing the meter unit in its operative position, the gear 29, disk 35 and gear 33, a portion of each of which extends through a suitable aperture in the cover 15 of the meter unit 10, must be accurately aligned for engagement with gear 28, Geneva wheel 34 and mutilated gear 32, respectively. To ensure proper alignment of these members, guide shoe 71 (FIGS. 5, 7 and 8), secured to the lower surface of the base 72 of meter unit 10 by any suitable means, such as a plurality of screws 73 (FIG. 8), is maintained in spaced relationship to the base 72 by means of a rectangular plate 74. In the inoperative position of the meter unit 10, the pair of ears 75, projecting laterally from each of the lengthwise edges of the guide shoe 71, register with suitable corresponding openings 76 in the support plate 77 for installation on, or removal from, the machine. Plate 77 is secured on spacer plate 78 which, in turn, is secured on the top surface of machine base cover 70, the plate 77 being parallel with the top of the cover 70.

As the meter unit 10 is placed on the plate 77 for installation on the machine, the ears 75 of guide shoe 71, in register with openings 76 in plate 77, drop into the confines of the channel 79 in spacer plate 78. Also, at this time, an aperture in the guide shoe 71 embraces the pin 80, which is secured on link 81, intermediate its ends, and extends upwardly through elongated slot 82 in the web portion 83 of plate 78. At its one end, link 81 is pivotally secured at 88 on one arm of bellcrank 89 rockably mounted about shoulder screw 90 on plate 77. The other arm of bellcrank 89 is provided with the finger grip 91, at its outer end, for controlling the rocking movement of the bellcrank to an active or inactive position and a corresponding reciprocation of link 81 in the recess 93 in the lower surface of the plate 78. Bellcrank 89 is resiliently maintained in either of its two positions by means of toggle spring 92.

As bellcrank 89 is rocked to the active position shown in FIG. 8 to move meter unit 10 into its operative position, accurate engagement of the driven members in the meter unit with the driving members in the base unit is ensured and maintained by virtue of the fact that the lengthwise defining walls of the channel 79 are parallel and the width of the channel is substantially equal to the overall width of guide shoe 71. Following the adjustment of the meter unit 10 into its operative position, any vertical movement of the meter unit is precluded by virtue of the fact that the thickness of the spacer plate 74 is only sufficiently greater than the thickness of the support plate 77 to enable the ears 75 on guide shoe 71 to move beneath the flanges 94 of plate 77.

Means are provided for preventing movement of the meter unit 10 to its inoperative position by an inadvertent rocking movement of the bellcrank 89, during the cyclic operation of the machine or at any time in other than the full-cycle condition of the main drive clutch 20. If such movement of the meter unit was possible, during the operation of the machine, and an attempt was made to immediately restore the meter unit to its operative position, the driving mechanism would be out of phase with the driven mechanism in the meter and damage to the parts would result therefrom. In order to prevent rocking of bellcrank 89 from its active to its inactive position, during a cycle of operation of clutch 20, a substantially T-shaped lever 100 (FIGS. 5 and 7) is pivotally mounted on a stud 101 secured on bracket 56 and is disposed in a plane adjacent the face of disk 61 of cyclic clutch 20. In the full-cycle position of the clutch 20, the upper inclined end surface of the crossarm 102 of T-shaped lever 100 is engaged by roller 62 secured on disk 61 of the clutch. Lever 100 is thereby maintained in the clockwise rocked position shown in FIG. 5 against the urgency of a spring 103 secured at its one end on a pin 104 on arm 105 of lever 100 and at its other end on a pin 106 secured on bracket 56. The depending portion of crossarm 102 extends through a suitable aperture 107 in the web portion of bracket 19, plate 78 and the top of base cover 70 and, at its end, is provided with a laterally projecting ear 108 adapted for engagement in a notch 109 in the free end of link 81 (FIG. 8). In the normal full-cycle condition of the clutch 20, the ear 108, disposed at an angle relative to the plane of the link 81, is maintained out of engagement with notch 109 in the link when the meter unit 10 is in its operative position, as seen in FIG. 5. However, immediately upon engagement of clutch 20, roller 62 is moved in a clockwise direction (FIG. 7) out of engagement with the upper inclined end surface of crossarm 102 of lever 100, enabling lever 100 to be rocked counter-clockwise, under the influence of spring 103, to a position determined by the engagement of the lower edge of arm 105 of the lever with pin 106. Whereupon, the inclined face of ear 108 engages the left-hand wall of the notch 109, thereby preventing movement of the link 81 to the right (FIGS. 7 and 8) for the adjustment of the meter unit 10 to its inoperative position.

What is claimed is:
1. In a mailing machine having a base unit and a detachable meter unit, a driving means within said base unit, a cyclic clutch for controlling operation of said driving means, an indicia printing member rotatably mounted in said meter unit, means supporting said meter unit on said base unit for adjustment to either an operative or inoperative position relative to said driving means, means associated with said printing member engageable with said driving means to control cyclic rotation of said printing member upon adjustment of said meter unit to operative position, means adjustable to either of two positions to control the adjustment of said meter unit, and mechanism for preventing adjustment of said meter unit to the inoperative position during operation of said driving means, the combination comprising a locking member normally disabled by said clutch in the fully-cycle position thereof and adapted for locking engagement with said adjustable means in one position thereof subsequent to adjustment of said meter unit to operative position, and a resilient means enabled by said clutch upon engagement thereof operable to effect engagement of said locking member with said adjustable means.

2. In a mailing machine, a base unit, a detachable meter unit, means for supporting said meter unit for adjustment on said base unit, a cyclically operable drive means within said base unit, a cyclic clutch for controlling operation of said drive means, an indicia printing member mounted for rotation within said meter unit, means associated with said printing member engageable with said drive means upon adjustment of said meter unit to an operative position to control cyclic rotation of said printing member, manually operable means adjustable to either of two positions, means operated by said manually operable means having a notch therein and a connection with said meter unit to control the adjustment of said meter unit to either the operative or inoperative position relative to said drive means, a locking member having a projection engageable in the notch in said operated means in the operative position of said meter unit and normally maintained disengaged by said clutch in the full-cycle position thereof, and means biasing said locking member to a position to effect engagement of the said projection in the notch in said operated means upon engagement of said clutch thereby preventing operation of said manually operable means to move said meter unit to an inoperative position.

References Cited by the Examiner
UNITED STATES PATENTS

| | | | |
|---|---|---|---|
| 1,995,577 | 3/1935 | Ogden et al. | 235—101 |
| 2,522,237 | 9/1950 | Ryan et al. | 235—101 |
| 3,133,700 | 5/1964 | Scherer et al. | 235—101 |

LEO SMILOW, *Primary Examiner.*